Aug. 7, 1956
L. PETERSEN
2,757,921
METHOD FOR BURNING OF MATERIALS WITH HEAT RECOVERY
Filed July 10, 1953
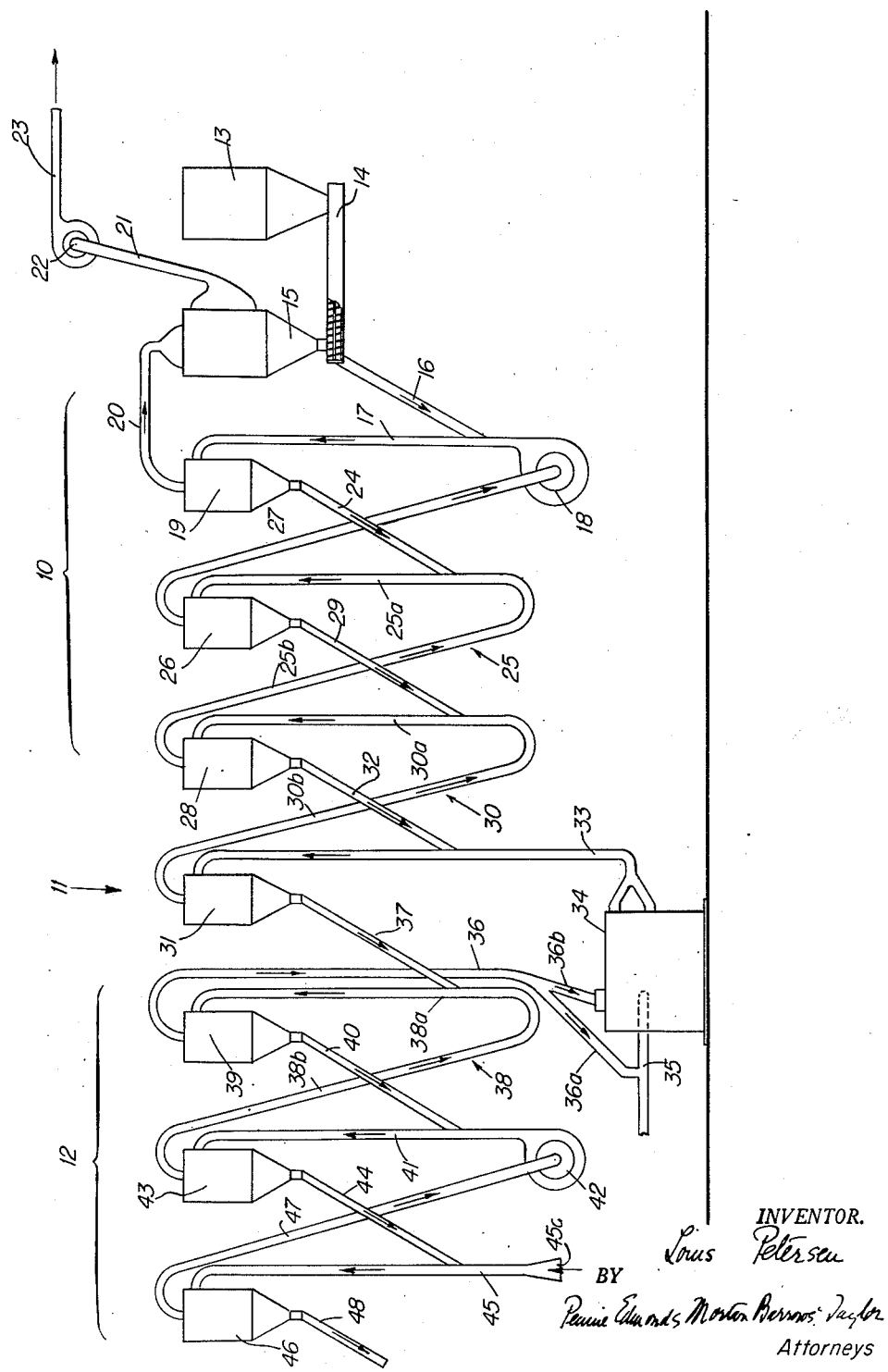
INVENTOR.
Louis Petersen
BY
Pennie Edmonds Morton Barrows Taylor
Attorneys

United States Patent Office 2,757,921
Patented Aug. 7, 1956

2,757,921

METHOD FOR BURNING OF MATERIALS WITH HEAT RECOVERY

Louis Petersen, Forest Hills, N. Y., assignor to F. L. Smidth & Co., New York, N. Y., a corporation of New Jersey Application July 10, 1953, Serial No. 367,198

1 Claim. (Cl. 263—52)

This invention relates to the burning of materials and is concerned more particularly with a novel method for burning materials, in which a highly efficient heat recovery from the waste gases and burned materials is obtained. In the practice of the new method, the materials, preliminarily reduced to finely divided form, are preheated by gases of combustion and then burned while in suspension in such gases, after which the burned materials are caused to travel in suspension in and to give up heat to the air to be employed in the burning of the fuel producing the gases of combustion. The preheating of the materials to be burned and the burning of such materials and the preheating of the air for combustion of the fuel are carried on in a plurality of stages, in each of which the materials are entrained in a flowing gaseous stream and carried along thereby for a substantial distance, after which the materials are separated from the entraining medium and the materials and medium pass in opposite directions to adjacent stages. In addition to the method described, the invention includes apparatus by which the method may be advantageously practiced.

The new method may be employed in burning operations for a number of purposes, such as roasting, calcining, sintering, and the like, and the method is thus applicable to the production of cement, the burning of lime, ad the metallurgical treatment of alumina and nickel oxide and similar ores. As all the advantages of the invention are realized in its application to the manufacture of cement, a form of the new method appropriate for that purpose will be illustrated and described in detail for purposes of explanation.

The production of Portland cement as now carried on involves the preparation by grinding operations of a raw material mix, which is then commonly burned in a rotary kiln in dry or slurry form, depending on whether the mix was produced by dry or wet grinding. In its passage through the kiln, the raw material is burned to clinker, which is cooled upon its discharge from the kiln by air, which is then supplied to the kiln for use in the combustion of the fuel. The kiln used in the production of cement clinker is of great length and is a costly piece of equipment to install and operate. In addition, a cement plant frequently includes a clinker cooler separate from the kiln, which is also expensive to install and operate.

The present invention is directed to the provision of a method of burning materials, which can be carried on with relatively simple equipment and with little expenditure of power and is highly efficient by reason of the low heat loss involved. In the practice of the new method in the production of Portland cement, the raw material mix in pulverulent form is introduced into a stream of hot gases of combustion to be entrained thereby and, after being carried along in the gas stream and absorbing heat therefrom, the materials are separated from the gases, which are then discharged to the atmosphere, while the materials are introduced into a stream of gases of higher temperature. The entrainment of the materials in a hot stream of gases followed by the separation of the materials from the gases is carried on in a series of stages, in which the gases are of successively higher temperatures, until the materials are finally burned to clinker. The gases used in the burning and preheating of the materials are produced by the burning of fuel in a combustion chamber and the air used in the burning in the fuel is preheated by heat derived from the clinker. For this purpose, the clinker is introduced into a stream of air traveling toward the combustion chamber and is entrained by and gives up heat to the air. The cooling of the clinker and the preheating of the combustion air are carried on in stages, at the end of each of which the clinker and air are separated and conducted in opposite directions to adjacent stages. When the clinker has been cooled as described to a temperature, at which it can be treated in such operations as grinding, the clinker is discharged from the last separator and delivered to the point of further treatment.

For a better understanding of the invention, reference may be made to the accompanying drawing, in which the single figure is a diagrammatic elevational view with parts broken away of one form of the new apparatus for the practice of the method of the invention.

The apparatus illustrated in the drawing includes a preheating section 10, a burning section 11, and a cooling section 12. Each section is made up of one or more units, in which a stage of the method is carried on with each stage completed by a separating operation.

The pulverulent material to be burned, for example, cement raw material, is supplied from a bin 13 discharging into a feeder 14, which may be a screw conveyor. The feeder also serves a dust filter 15 and the feed is thus a mixture of raw material and dust. The material discharged by the feeder enters a duct 16, through which it travels downwardly by gravity to enter a duct 17 leading upwardly from the outlet of a fan 18 to a separator 19. The finely divided material entering the gas stream traveling through duct 17 is entrained thereby and carried into separator 19. The separator has an outlet for gases at its top, which is connected by a duct 20 to the dust filter 15, and the filter has an outlet for gases, which is connected by a duct 21 to the intake of a fan 22. The outlet of the fan is connected by a duct 23 to a stack not shown.

The separator 19 has an outlet for solids at its lower end, and a duct 24 connected to the outlet leads into the upwardly extending section 25a of a duct 25. Section 25a leads at its upper end to the inlet of a separator 26 having a gas outlet at its top connected by a duct 27 to the inlet of fan 18. The duct 25 has a second section 25b, which leads from the gas outlet of a separator 28 to the lower end of section 25a. The separator 26 has a solids outlet at its lower end, which is connected by a duct 29 to the upwardly extending section 30a of a duct 30. Section 30a leads at its upper end into the separator 28 and its lower end is connected by section 30b of duct 30 to the gas outlet of a separator 31. The separator 28 has an outlet for solids at its bottom, which is connected by a duct 32 to a duct 33 extending upwardly.

The duct 33 is connected to the outlet of a combustion chamber 34, in which fuel is burned to produce hot burned gases, which are led through duct 33 to enter the separator 31. The fuel may be supplied to the combustion chamber in any suitable way and, in the installation illustrated, the fuel used is pulverulent and is introduced into the chamber in a mixture with primary air for combustion through a burner pipe 35. The primary air for combustion is supplied to the burner pipe through a branch 36a of a duct 36 and duct 36 has a branch 36b, by which secondary air for combustion is introduced into the combustion chamber.

The separator 31 has an outlet for solids at its bottom, which is connected by a duct 37 to an upwardly extending section 38a of a duct 38. The section 38a extends to the inlet of a separator 39 having a gas outlet from which the duct 36 leads. The separator 39 has a solids outlet at its bottom, which is connected by a duct 40 to a duct 41, which extends upwardly from the outlet of a fan 42 to the inlet of a separator 43. Separator 43 has an outlet for gases, to which the downwardly extending section 38b of duct 38 is connected, and also has a solids outlet at its bottom, which is connected by a duct 44 to an upwardly extending duct 45 having an open air intake 45a at its lower end. The duct 45 is connected to the inlet of a separator 46 having a gas outlet at its top connected by a duct 47 to the inlet of fan 42. The separator 46 has an outlet for solids at its bottom, from which a duct 48 leads to a delivery point.

In the operation of the apparatus illustrated in the practice of the new method, fuel is burned in the combustion chamber 34 by means of primary and secondary air, which is drawn through duct 45 and separator 46 by fan 42 and passed successively through separators 43 and 39 and into the combustion chamber. The hot gases of combustion issuing from the chamber pass upwardly through duct 33 into separator 31 and then travel through duct 30 into and through separator 28. From separator 28, the gases travel through duct 25 into and through separator 26. The gases are drawn from separator 26 through duct 27 by fan 18 and then travel upwardly to pass through separator 19 and into the filter 15, from which the gases are drawn by fan 22 and discharged into the stack.

A mixture of pulverulent raw material and dust is fed into the upwardly flowing gas stream in duct 17 by feeder 14 and the gases are separated from the solids in separator 19 and pass to the dust filter 15. The finely divided material entering the duct 17 is entrained in the gas stream flowing therethrough and takes up heat from the gases while being carried along thereby. The solids separated from the gases in separator 19 are then introduced into the upwardly flowing gas stream in duct section 25a and are again carried along by the flowing stream of gases and take up heat therefrom. Solids and gases are separated in separator 26 and the gases are passed on to the inlet of fan 18, while the solids are led through duct 29 into the stream of gases flowing upwardly through duct section 30a. The flowing gas stream entrains the solids and carries them along into separator 28, from which the gases leave through duct 25 and the solids through duct 32. The solids are delivered into the hot gases passing upwardly from the combustion chamber 33 into separator 31 and the pulverulent material entrained in the hot gases is heated thereby.

It will be apparent that the gases rising through the duct 33 from the combustion chamber are at a high temperature and the gases traveling upwardly through duct sections 30a and 25a and duct 17 are at successively lower temperatures. The materials supplied to the system and traveling through the preheating section 10, which includes duct 17 and duct sections 25a and 30a, are, accordingly, raised in temperature in the successive stages, in which the materials travel upwardly by entrainment by flowing gas streams traveling toward separators 19, 26, and 28. By the time the materials leave separator 28, their temperature is so high that, when they enter the hot gases passing directly from the combustion chamber through duct 33, the materials are burned in their travel through duct 33 to separator 31. The duct 33 and separator 31 thus provide the burning section 11 of the apparatus.

In the cooling section 12 of the installation, the hot burned materials give up heat in successive stages to gases, which are to be used for combustion, and, as in other sections, the heat transfer from the materials to the gases is effected by causing the materials to be entrained in a flowing gas stream in each stage. As the materials are carried upward successively through ducts 38a, 41, and 45, their temperature falls successively. At the same time, the temperature of the gases effecting the entrainment of the materials is raised in successive stages until the materials issuing through the discharge duct 48 have been reduced in temperature to the desired degree, and the gases supplied through duct 36 to the combustion chamber 34 have extracted the optimum amount of heat from the burned materials.

In the installation illustrated, the preheating of the material is carried on in three stages, the burning of the material is effected in one stage, and the cooling of the material takes place in three stages. It is to be understood that the number of stages employed in the preheating, burning, and cooling sections of the apparatus depend on the material being treated and will be varied as required for best results. In the apparatus shown, the separators are illustrated as of the cyclone type, but separators of other forms may be used instead of the cyclones. Also, the dust filter 15 may be of any of the conventional forms of such apparatus.

In the new system, there are no heavy moving parts, such as a rotary kiln, and operation of the system can be carried on with a relatively low consumption of power. The intimate contact of the gases and the materials results in an efficient heat exchange and the heat transfer occurs so rapidly that a relatively small number of stages is required in the different sections of the system. The space requirements of the apparatus are, accordingly, much less than those for a conventional rotary kiln installation or a rotary kiln provided with a flash preheating unit.

I claim:

A method of burning finely divided materials, which comprises burning fuel in a combustion space, maintaining a flow of the waste gases from the combustion space to the atmosphere in a stream, all parts of which travel continuously away from the space, introducing the materials into the gas stream to be entrained and heated in said stream, separating the materials from the gas stream after their travel with the stream along a path of substantial length, repeating the introduction of the materials into the gas stream, the entrainment and heating of the materials in the gas stream, and the separation of the materials from the gas stream in a plurality of stages with the points of introduction of the materials into the stream lying successively nearer to the combustion space, the temperatures of the gases and materials in the final heating stage being sufficient to cause burning of the materials, maintaining a flow of air from the atmosphere to the combustion space in a stream, all parts of which travel continuously toward the combustion space, introducing the burned materials separated from the gas stream into the air stream adjacent the combustion space to be entrained and cooled in said air stream, separating the materials from the air stream after their travel with the air stream along a path of substantial length, repeating the introduction of the materials into the air stream, the entrainment and cooling of the materials in the air stream, and the separation of the materials from the air stream in a plurality of stages with the points of introduction of the materials into the air stream lying successively farther from the combustion space, and discharging the materials after the separation thereof from the air stream in the last stage.

References Cited in the file of this patent

UNITED STATES PATENTS

| | | |
|---|---|---|
| 1,545,000 | Lord | July 7, 1925 |
| 1,577,534 | Miller | Mar. 23, 1926 |
| 1,927,596 | Rosin | Sept. 19, 1933 |
| 2,156,924 | Schneider | May 2, 1939 |
| 2,648,532 | Muller et al. | Aug. 11, 1953 |
| 2,659,587 | Bowen | Nov. 17, 1953 |